United States Patent
Tajima

(10) Patent No.: US 10,479,219 B2
(45) Date of Patent: Nov. 19, 2019

(54) CONTROLLER FOR AC ELECTRIC MOTOR

(71) Applicant: FUJI ELECTRIC CO., LTD., Kawasaki-shi, Kanagawa (JP)

(72) Inventor: Hirokazu Tajima, Suzuka (JP)

(73) Assignee: FUJI ELECTRIC CO., LTD., Kawasaki-Shi, Kanagawa (JP)

(*) Notice: Subject to any disclaimer, the term of this patent is extended or adjusted under 35 U.S.C. 154(b) by 0 days.

(21) Appl. No.: 16/043,906

(22) Filed: Jul. 24, 2018

(65) Prior Publication Data

US 2019/0084431 A1  Mar. 21, 2019

(30) Foreign Application Priority Data

Sep. 21, 2017 (JP) .................... 2017-181607

(51) Int. Cl.
*B60L 50/51* (2019.01)
*B60W 10/08* (2006.01)

(52) U.S. Cl.
CPC ............. *B60L 50/51* (2019.02); *B60W 10/08* (2013.01); *B60L 2200/26* (2013.01)

(58) Field of Classification Search
CPC .... H02P 21/22; H02P 21/18; B60L 2240/423; B60L 2240/421; B60L 50/51; B60L 2240/527; B60L 2260/44; B60W 10/08; B60W 2510/081; B60W 2510/083; B60W 2050/0012

See application file for complete search history.

(56) References Cited

U.S. PATENT DOCUMENTS

| 5,565,752 | A | * | 10/1996 | Jansen | H02K 17/165 |
|---|---|---|---|---|---|
| | | | | | 310/169 |
| 5,585,709 | A | * | 12/1996 | Jansen | H02K 17/165 |
| | | | | | 318/720 |
| 5,717,305 | A | * | 2/1998 | Seibel | H02P 1/26 |
| | | | | | 318/432 |
| 5,923,144 | A | * | 7/1999 | Seibel | H02P 21/18 |
| | | | | | 318/805 |
| 2007/0296361 | A1 | * | 12/2007 | Tajima | H02P 23/14 |
| | | | | | 318/268 |

FOREIGN PATENT DOCUMENTS

JP  2015-033282 A  2/2015

* cited by examiner

*Primary Examiner* — Thai T Dinh

(74) *Attorney, Agent, or Firm* — Manabu Kanesaka

(57) ABSTRACT

A controller for an AC electric motor includes an acquirer that acquires at least one of a frequency of an output voltage of a power converter and an estimated value of a rotational speed of the AC electric motor, and a frequency component remover that removes a predetermined frequency component from an acquired value by feedforward control, using the acquired value acquired by the acquirer as an input value.

10 Claims, 3 Drawing Sheets

FIRST EMBODIMENT

SECOND EMBODIMENT

THIRD EMBODIMENT

MODIFIED EXAMPLE OF FIRST TO THIRD EMBODIMENTS

CONTROLLER FOR AC ELECTRIC MOTOR

CROSS-REFERENCE TO RELATED APPLICATION

The priority application number JP2017-181607, Controller for AC Electric Motor, filed Sep. 21, 2017, Hirokazu Tajima, upon which this patent application is based, is hereby incorporated by reference.

BACKGROUND OF THE INVENTION

Field of the Invention

The present invention relates to a controller for an AC electric motor in a speed sensorless control system for an automobile or a railroad vehicle, for example, and more particularly, it relates to a controller for an AC electric motor including a frequency component remover that removes a predetermined frequency component.

Description of the Background Art

A controller for an AC electric motor including a frequency component remover that removes a predetermined frequency component is known in general, as disclosed in Japanese Patent Laying-Open No. 2015-033282.

A controller for an electric motor disclosed in Japanese Patent Laying-Open No. 2015-033282 includes a position and speed estimator, a calculator, a speed controller, a current controller, and a current detector. The calculator outputs a difference between the rotational speed of the electric motor estimated by the position and speed estimator and a speed command. In addition, the output from the calculator is input into the speed controller. The speed controller performs control calculation such that the rotational speed of the electric motor follows the speed command, and outputs a current command. The output from the speed controller is input into the current controller. The current controller performs control calculation such that a current to be input into the electric motor, which has been detected by the current detector, follows the current command, and outputs a voltage to be applied to the electric motor. The position and speed estimator estimates the rotational position and rotational speed of the electric motor based on the current and voltage information input from the current controller.

The position and speed estimator includes a position error estimator, a notch filter, and a position and speed estimation calculator. The position error estimator estimates a position error based on the current and voltage information input from the current controller. The notch filter removes a harmonic component from the position error estimated by the position error estimator. The position and speed estimation calculator estimates the rotational position and rotational speed of the electric motor based on the position error from which the harmonic component has been removed by the notch filter. In this case, it is determined, based on an output from the position and speed estimation calculator, whether or not a control system for position and speed estimation is stable. When the control system for position and speed estimation is stable, the number of notch filters is increased by one. This control is repeated until the control system for position and speed estimation becomes unstable. Thus, the number of notch filters that allows control stability to be ensured is determined. In the position and speed estimator, feedback control for estimating the position and the speed is performed by using the number of notch filters that allows stability of the control system to be ensured.

In general, in feedback control, a control system may not return to a stable state but may remain in an unstable state when an external factor that disturbs the control occurs such that the control system becomes unstable. In such a case, in the controller for the electric motor described in Japanese Patent Laying-Open No. 2015-033282, the control system of position and speed estimation becomes unstable such that even when the number of notch filters that allows control stability to be ensured is used, the control system does not return to a stable state, and it becomes difficult to accurately estimate the rotational speed (rotational position) of the electric motor. That is, in the controller for the electric motor described in Japanese Patent Laying-Open No. 2015-033282, it may be difficult to stably estimate the rotational speed (rotational position) of the electric motor.

SUMMARY OF THE INVENTION

The present invention has been proposed in order to solve the aforementioned problem, and an object of the present invention is to provide a controller for an AC electric motor capable of stably estimating the rotational speed of the AC electric motor.

In order to attain the aforementioned object, a controller for an AC electric motor according to a first aspect of the present invention controls driving of the AC electric motor based on a voltage command value set based on one of a torque command value and a speed command value for driving the AC electric motor and a current detection value at which a current that flows to the AC electric motor during the driving of the AC electric motor is detected, and includes a power converter that drives the AC electric motor, an acquirer that acquires at least one of a frequency of an output voltage of the power converter and an estimated value of a rotational speed of the AC electric motor based on the voltage command value and the current detection value, and a frequency component remover that removes a predetermined frequency component from an acquired value by feedforward control, using the acquired value acquired by the acquirer as an input value.

Unlike feedback control in which a control system is controlled (adjusted) to return to a stable state when the control system becomes unstable, in the feedforward control, a control system is controlled (adjusted) in advance not to become unstable even when an external factor that disturbs the control occurs. Therefore, as described above, the controller for the AC electric motor according to the first aspect of the present invention includes the frequency component remover that removes the predetermined frequency component from the acquired value by the feedforward control such that it is possible to significantly reduce or prevent unstable control to remove the frequency component. Thus, the predetermined frequency component can be stably removed from the frequency of the output voltage of the power converter and the estimated value of the rotational speed of the AC electric motor. Consequently, the rotational speed of the AC electric motor can be stably estimated.

The aforementioned controller for the AC electric motor according to the first aspect preferably further includes a parameter calculator into which information based on the acquired value is input and that acquires, based on the input information, a parameter that the frequency component remover uses to remove the predetermined frequency component, and the frequency component remover preferably removes the predetermined frequency component from the acquired value by the feedforward control, using the acquired value and the parameter acquired by the parameter calculator as input values. When the parameter used to remove the predetermined frequency component by the feedback control is acquired, the state (value) of the acquired parameter may also become unstable due to instability of the control system. Therefore, the parameter is acquired by the feedforward control such that the state (value) of the parameter can be stabilized. Thus, the rotational speed of the AC electric motor can be more stably estimated.

In this case, the controller for the AC electric motor preferably further includes a limiter that limits a range of the acquired value acquired by the acquirer that the parameter calculator uses to acquire the parameter. According to this structure, the range unnecessary for parameter acquisition is limited by the limiter, and hence the control load of the parameter calculator can be reduced.

In the aforementioned controller for the AC electric motor according to the first aspect, the frequency component remover preferably removes a plurality of frequency components in descending order of frequencies to be removed when removing the plurality of frequency components different from each other. When the frequency component on the low frequency side and the frequency component on the high frequency side overlap each other at the acquired value, it is relatively difficult to accurately remove the component on the low frequency side in a state where the component on the high frequency side having a waveform with a relatively complicated shape remains. Therefore, the frequency component is removed in descending order of frequencies to be removed such that the component on the low frequency side can be removed in a state where the component on the high frequency side having a waveform with a complicated shape has been removed, and hence the frequency component on the low frequency side can be relatively easily removed even when the frequency component on the low frequency side and the frequency component on the high frequency side overlap each other at the acquired value.

In the aforementioned controller for the AC electric motor according to the first aspect, the frequency component remover preferably removes a plurality of frequency components in order from a frequency of a larger ripple generated in the acquired value when removing the plurality of frequency components different from each other. According to this structure, a removal of the frequency component at least in a subsequent stage of removals of the plurality of frequency components can be performed in a state where the influence of a ripple (pulsating component) due to an estimation error is relatively significantly reduced or prevented. Consequently, the estimation error of the rotational speed of the AC electric motor can be effectively reduced as compared with the case where a plurality of frequency components is removed in a state where relatively large ripples remain.

The aforementioned controller for the AC electric motor, in which the frequency component remover removes the plurality of frequency components different from each other, preferably further includes a parameter calculator into which information based on the acquired value is input and that acquires, based on the input information, a parameter that the frequency component remover uses to remove the predetermined frequency component, and the frequency component remover preferably removes each of the plurality of frequency components by the feedforward control, using the parameter acquired by the parameter calculator based on the information used for a first frequency component removal of removals of the plurality of frequency components as the input value. According to this structure, in the removals of the plurality of frequency components, the parameter can be acquired by the parameter calculator based on the common information. Consequently, the amount of information input into the parameter calculator can be reduced as compared with the case where a parameter is acquired by the parameter calculator based on pieces of information different from each other, and hence the control load of the parameter calculator can be reduced.

The aforementioned controller for the AC electric motor, in which the frequency component remover removes the plurality of frequency components different from each other, preferably further includes a parameter calculator into which information based on the acquired value is input and that acquires, based on the input information, a parameter that the frequency component remover uses to remove the predetermined frequency component, and the frequency component remover preferably removes a first frequency component by the feedforward control, using the parameter acquired by the parameter calculator based on first information based on the acquired value as the input value, and removes a second frequency component different from the first frequency component by the feedforward control, using the parameter acquired by the parameter calculator based on second information based on the acquired value from which the first frequency component has been removed as the input value. According to this structure, the parameter is acquired by the parameter calculator based on the second information based on the acquired value from which the first frequency component has been removed such that the parameter used to remove the second frequency component can be acquired in a state where the first frequency component due to an estimation error has been removed, and hence a parameter more appropriate to remove the second frequency component can be acquired by the parameter calculator.

A controller for an AC electric motor according to a second aspect of the present invention controls driving of the AC electric motor based on a voltage command value set based on one of a torque command value and a speed command value for driving the AC electric motor and a current detection value at which a current that flows to the AC electric motor during the driving of the AC electric motor is detected, and includes a control unit and a power converter that drives the AC electric motor. The control unit acquires at least one of a frequency of an output voltage of the power converter and an estimated value of a rotational speed of the AC electric motor based on the voltage command value and the current detection value, and removes a predetermined frequency component from an acquired value by feedforward control based on the acquired value.

In the controller for the AC electric motor according to the second aspect of the present invention, as described above, the control unit removes the predetermined frequency component from the acquired value by the feedforward control such that it is possible to significantly reduce or prevent unstable control to remove the frequency component. Thus, the rotational speed of the AC electric motor can be stably estimated.

In the aforementioned controller for the AC electric motor according to the second aspect, the control unit preferably acquires a parameter used to remove the predetermined frequency component based on information based on the acquired value, and removes the predetermined frequency component from the acquired value by the feedforward control based on the acquired value and the acquired parameter. According to this structure, the control unit acquires the parameter by the feedforward control such that the state (value) of the parameter can be stabilized. Thus, the rotational speed of the AC electric motor can be more stably estimated.

In this case, the control unit preferably limits a range of the acquired value used to acquire the parameter. According to this structure, the range unnecessary for parameter acquisition is limited, and hence the control load of the control unit to acquire the parameter can be reduced.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
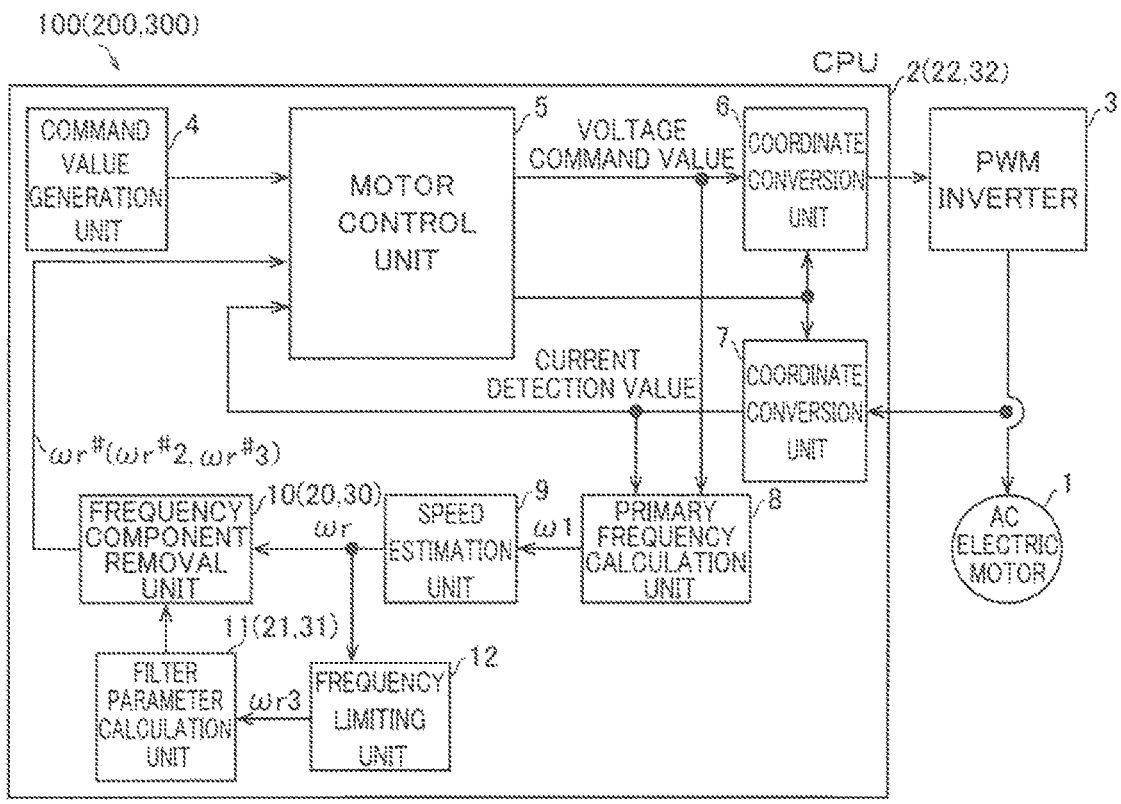
FIG. 1 is a diagram showing the overall structure of a controller for an AC electric motor according to first to third embodiments.

Embodiments of the present invention are hereinafter described with reference to the drawings.

First Embodiment

The structure of a controller 100 for an AC electric motor 1 according to a first embodiment is now described with reference to FIGS. 1 to 3. The AC electric motor 1 is an induction motor.

(Structure of Controller for AC Electric Motor)

First, the structure of the controller 100 for the AC electric motor 1 is described with reference to FIG. 1. As shown in FIG. 1, the controller 100 includes a CPU 2 and a PWM inverter 3. The CPU 2 functions as a command value generation unit 4, a motor control unit 5, a coordinate conversion unit 6, a coordinate conversion unit 7, a primary frequency calculation unit 8, a speed estimation unit 9, a frequency component removal unit 10, a filter parameter calculation unit 11, and a frequency limiting unit 12. In the CPU 2, the functions of the command value generation unit 4, the motor control unit 5, the coordinate conversion unit 6, the coordinate conversion unit 7, the primary frequency calculation unit 8, the speed estimation unit 9, the frequency component removal unit 10, the filter parameter calculation unit 11, and the frequency limiting unit 12 can be achieved by software such as programs. The speed estimation unit 9 and the frequency component removal unit 10 are examples of an "acquirer" and a "frequency component remover" in the claims, respectively. The CPU 2 and the PWM inverter 3 are examples of a "control unit" and a "power converter" in the claims, respectively. The filter parameter calculation unit 11 and the frequency limiting unit 12 are examples of a "parameter calculator" and a "limiter" in the claims, respectively. Note that FIG. 1 is a schematic diagram, and illustration and description of functions (blocks) unnecessary for the description are omitted.

The command value generation unit 4 (CPU 2) outputs a torque command value and a speed command value for driving the AC electric motor 1. The motor control unit 5 (CPU 2) performs PI control based on one (the speed command value according to the first embodiment, for example) of the torque command value and the speed command value output from the command value generation unit 4 to set a voltage command value.

The coordinate conversion unit 6 (CPU 2) converts a coordinate system of the voltage command value set by the motor control unit 5 from rotational coordinates to fixed coordinates. The PWM inverter 3 outputs a voltage for driving the AC electric motor 1 based on an output from the coordinate conversion unit 6.

The coordinate conversion unit 7 (CPU 2) converts a coordinate system of a current that flows from the PWM inverter 3 to the AC electric motor 1 from fixed coordinates to rotational coordinates. The motor control unit 5 performs PI control based on a current detection value (a current that flows from the PWM inverter 3 to AC electric motor 1 during the driving of the AC electric motor 1) obtained by converting the coordinate system by the coordinate conversion unit 7. That is, the controller 100 controls the driving of the AC electric motor 1 based on the voltage command value output from the motor control unit 5 and the current detection value output from the coordinate conversion unit 7.

The primary frequency calculation unit 8 (CPU 2) acquires (calculates) the frequency (primary frequency command value $\omega 1$) of the output voltage of the PWM inverter 3 based on the voltage command value set by the motor control unit 5 and the current detection value acquired by the coordinate conversion unit 7.

The speed estimation unit 9 (CPU 2) estimates the rotational speed of the AC electric motor 1 based on the primary frequency command value $\omega 1$ acquired by the primary frequency calculation unit 8. Specifically, the speed estimation unit 9 subtracts a slip frequency command value of the AC electric motor 1 acquired by a slip frequency calculation unit (not shown) from the primary frequency command value $\omega 1$ acquired by the primary frequency calculation unit 8 to acquire (calculate) an estimated value $\omega r$ of the rotational speed of the AC electric motor 1. The estimated value $\omega r$ of the rotational speed of the AC electric motor 1 is an example of an "acquired value" in the claims.

The estimated value $\omega r$ of the rotational speed of the AC electric motor 1 is acquired based on the voltage and the current in the controller 100, as described above, and hence ripple components included in the voltage and the current in the controller 100 appear (are superimposed) on the estimated value $\omega r$. Specifically, the ripple components with frequencies one, two, and six times the fundamental frequency of the AC electric motor 1 prominently appear on the estimated value $\omega r$. The ripple component with a frequency one time the fundamental frequency appears due to the offset error of the voltage generated by the PWM inverter 3 and the offset error of the current detector. The ripple component with a frequency two times the fundamental frequency appears due to the unbalanced amplitude of a three-phase alternating current (voltage). The ripple component with a frequency six times the fundamental frequency appears due to distortion that occurs in the vicinity of a zero value of the three-phase alternating current.

According to the first embodiment, the frequency component removal unit 10 (CPU 2) removes predetermined frequency components from the estimated value ωr by feedforward control, using the estimated value ωr acquired by the speed estimation unit 9 as an input value. It should be noted that the frequency component removal unit 10 includes a notch filter (band elimination filter).

Figure 2:
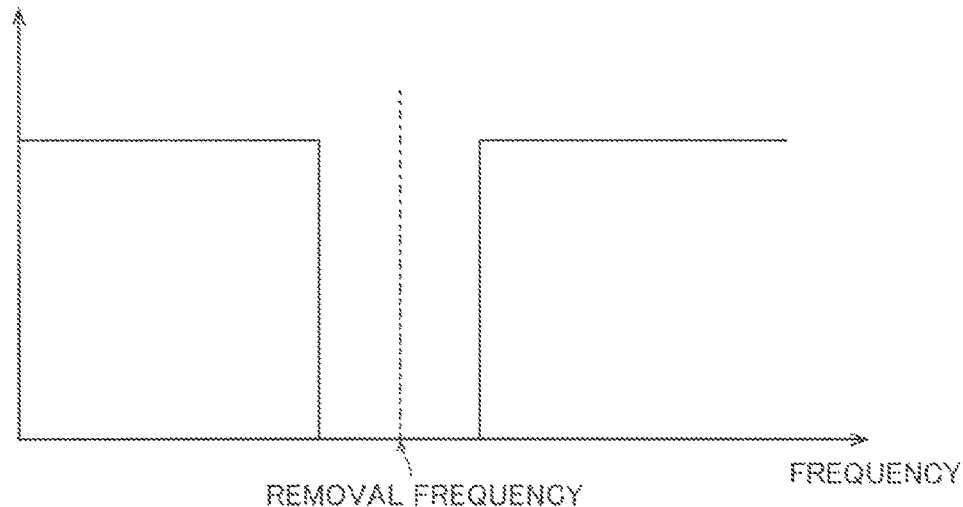
FIG. 2 is a schematic diagram for illustrating removal of a predetermined frequency component by a frequency component remover according to the first to third embodiments.

As shown in FIG. 2, the frequency component removal unit 10 cuts off a frequency component in a certain range around a predetermined removal frequency so as to reduce the amplitude to zero. FIG. 2 is a schematic diagram.

Figure 3:
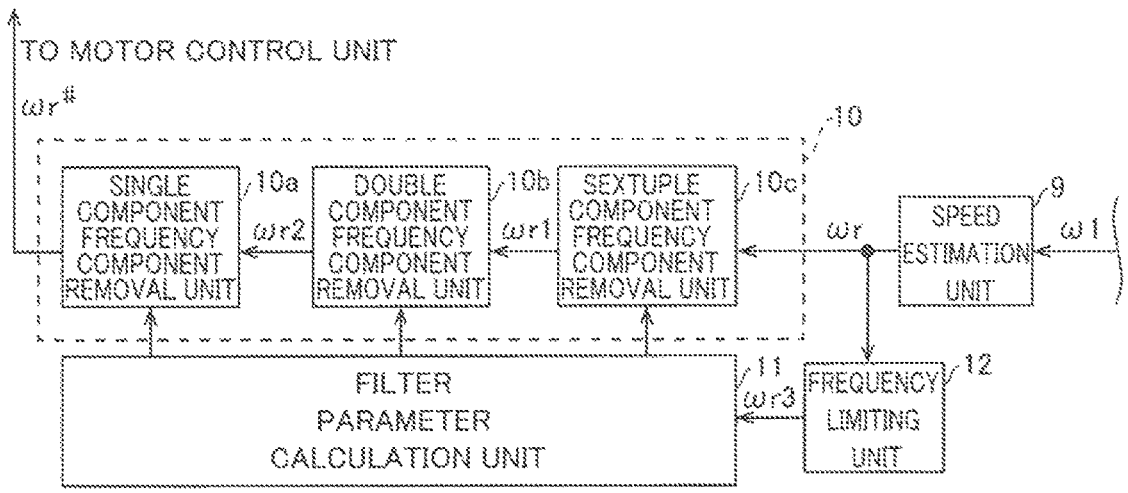
FIG. 3 is a diagram for illustrating the frequency component remover of the controller for the AC electric motor according to the first embodiment.

Specifically, as shown in FIG. 3, the frequency component removal unit 10 (CPU 2 (see FIG. 1)) includes a single component frequency component removal unit 10a, a double component frequency component removal unit 10b, and a sextuple component frequency component removal unit 10c. That is, a frequency component with the frequency one time the fundamental frequency of the AC electric motor 1 (hereinafter referred to as a single frequency component) is removed from the estimated value ωr by the single component frequency component removal unit 10a. A frequency component with the frequency two times the fundamental frequency of the AC electric motor 1 (hereinafter referred to as a double frequency component) is removed from the estimated value ωr by the double component frequency component removal unit 10b. A frequency component with the frequency six times the fundamental frequency of the AC electric motor 1 (hereinafter referred to as a sextuple frequency component) is removed from the estimated value ωr by the sextuple component frequency component removal unit 10c. Thus, the ripple components that have appeared on the estimated value ωr can be effectively removed from the estimated value ωr acquired by the speed estimation unit 9 (CPU 2). The single component frequency component removal unit 10a, the double component frequency component removal unit 10b, and the sextuple component frequency component removal unit 10c are examples of a "frequency component remover" in the claims.

According to the first embodiment, the frequency component removal unit 10 removes a plurality of frequency components in descending order of frequencies to be removed when removing the plurality of frequency components different from each other. That is, first, the sextuple component frequency component removal unit 10c removes the frequency component from the estimated value ωr acquired by the speed estimation unit 9. Next, the double component frequency component removal unit 10b removes the frequency component from the estimated value ωr1 from which the frequency component has been removed by the sextuple component frequency component removal unit 10c. Finally, the single component frequency component removal unit 10a removes the frequency component from the estimated value ωr2 from which the frequency component has been removed by the double component frequency component removal unit 10b. Then, the motor control unit 5 (CPU 2) performs PI control based on the estimated value ωr$^{\#}$ from which the frequency component has been removed by the single component frequency component removal unit 10a.

The filter parameter calculation unit 11 (the CPU 2) acquires, based on an estimated value ωr3 based on the estimated value ωr, parameters that the frequency component removal unit 10 uses to remove the predetermined frequency components. Specifically, the filter parameter calculation unit 11 acquires, based on the common estimated value ωr3, the parameters used to remove the single frequency component, the double frequency component, and the sextuple frequency component. That is, the estimated value ωr3 used to first remove the sextuple frequency component is also used to acquire parameters used to remove the remaining frequency components.

More specifically, the filter parameter calculation unit 11 acquires, based on the estimated value ωr3, coefficients used to perform calculation when the frequency component removal unit 10 removes the frequency components (by Z conversion). It should be noted that the estimated value ωr3 is a value acquired by the frequency limiting unit 12 described later based on the estimated value ωr. The estimated value ωr3 is an example of "information" in the claims.

According to the first embodiment, the frequency component removal unit 10 removes the frequency components from the estimated value ωr by feedforward control, using the estimated value ωr and the parameters acquired by the filter parameter calculation unit 11 as input values. That is, in the feedforward control, the parameters are acquired by the filter parameter calculation unit 11 using the input value to the frequency component removal unit 10. On the other hand, in feedback control, a (subsequent) parameter is acquired using an output value from a frequency component removal unit.

Specifically, the frequencies of the frequency components to be removed by the frequency component removal unit 10 are designated (switched) based on the parameters acquired by the filter parameter calculation unit 11.

That is, the filter parameter calculation unit 11 acquires a parameter (hereinafter referred to as a single component parameter) for allowing the frequency component removal unit 10 to function as the single component frequency component removal unit 10a, a parameter (hereinafter referred to as a double component parameter) for allowing the frequency component removal unit 10 to function as the double component frequency component removal unit 10b, and a parameter (hereinafter referred to as a sextuple component parameter) for allowing the frequency component removal unit 10 to function as the sextuple component frequency component removal unit 10c.

Then, the frequency component removal unit 10 uses the parameters acquired by the filter parameter calculation unit 11 in the order of the sextuple component parameter, the double component parameter, and the single component parameter to remove the frequency components in the order of the sextuple frequency component, the double frequency component, and the single frequency component.

According to the first embodiment, the frequency limiting unit 12 (CPU 2) limits the range of the estimated value ωr acquired by the speed estimation unit 9 that the filter parameter calculation unit 11 uses to acquire the parameters. Specifically, the frequency limiting unit 12 acquires the estimated value ωr3 obtained by partially limiting the estimated value ωr. That is, the frequency limiting unit 12 acquires (calculates) the estimated value ωr3 by setting the upper limit and the lower limit of the estimated value ωr.

More specifically, the upper limit of the estimated value ωr is set based on the sampling theorem. When the control period of the CPU 2 (a microcomputer including the CPU 2) is 1 ms, for example, 500 Hz, which is ½ of the frequency (1000 Hz) corresponding to the control period, corresponds to the maximum value of the upper limit that is allowable based on the sampling theorem. That is, the frequency limiting unit 12 sets a value of 500 Hz or less as a frequency corresponding to the upper limit of the estimated value ωr. As a frequency corresponding to the lower limit of the estimated value ωr, a frequency (5 Hz, for example) at which a DC component of the estimated value ωr is not cut is set.

Effects of First Embodiment

According to the first embodiment, the following effects can be obtained.

According to the first embodiment, as described above, the controller 100 for the AC electric motor 1 includes the speed estimation unit 9 (CPU 2) that acquires the estimated value ωr of the rotational speed of the AC electric motor 1 based on the voltage command value and the current detection value, and the frequency component removal unit 10 (CPU 2) that removes the predetermined frequency components from the estimated value ωr by feedforward control, using the estimated value ωr acquired by the speed estimation unit 9 as the input value. Unlike feedback control in which a control system is controlled (adjusted) to return to a stable state when the control system becomes unstable, in the feedforward control, a control system is controlled (adjusted) in advance not to become unstable even when an external factor that disturbs the control occurs. Therefore, the frequency component removal unit 10 removes the predetermined frequency components from the estimated value ωr by the feedforward control such that it is possible to significantly reduce or prevent unstable control to remove the frequency components. Thus, the predetermined frequency components can be stably removed from the estimated value ωr of the rotational speed of the AC electric motor 1. Consequently, the rotational speed of the AC electric motor 1 can be stably estimated.

According to the first embodiment, as described above, in the controller 100 for the AC electric motor 1, the frequency component removal unit 10 (CPU 2) removes the predetermined frequency components from the estimated value ωr by feedforward control, using the estimated value ωr and the parameters acquired by the filter parameter calculation unit 11 (CPU 2) as the input values. When the parameters used to remove the predetermined frequency components by feedback control is acquired, the states (values) of the acquired parameters may also become unstable due to instability of the control system. Therefore, the parameters are acquired by feedforward control such that the states (values) of the parameters can be stabilized. Thus, the rotational speed of the AC electric motor 1 can be more stably estimated.

According to the first embodiment, as described above, the controller 100 for the AC electric motor 1 further includes the frequency limiting unit 12 (CPU 2) that limits the range of the estimated value ωr acquired by the speed estimation unit 9 that the filter parameter calculation unit 11 (CPU 2) uses to acquire the parameters. Thus, the range unnecessary for parameter acquisition is limited by the frequency limiting unit 12, and hence the control load of the filter parameter calculation unit 11 (CPU 2) can be reduced.

According to the first embodiment, as described above, in the controller 100 for the AC electric motor 1, the frequency component removal unit 10 (CPU 2) removes the plurality of frequency components in descending order of frequencies to be removed when removing the plurality of frequency components different from each other. When the frequency component on the low frequency side and the frequency component on the high frequency side overlap each other at the estimated value ωr, it is relatively difficult to accurately remove the component on the low frequency side in a state where the component on the high frequency side having a waveform with a relatively complicated shape remains. Therefore, the frequency components are removed in descending order of frequencies to be removed such that the component on the low frequency side can be removed in a state where the component on the high frequency side having a waveform with a complicated shape has been removed, and hence the frequency component on the low frequency side can be relatively easily removed even when the frequency component on the low frequency side and the frequency component on the high frequency side overlap each other at the estimated value ωr.

According to the first embodiment, as described above, in the controller 100 for the AC electric motor 1, the frequency component removal unit 10 (CPU 2) removes the plurality of frequency components by feedforward control, using the parameters acquired by the filter parameter calculation unit 11 (CPU 2) based on the estimated value ωr3 used for the first frequency component removal (the sextuple frequency component removal) of the removals of the plurality of frequency components as the input value. Thus, in the removals of the plurality of frequency components, the parameters can be acquired by the filter parameter calculation unit 11 based on the common estimated value ωr3. Consequently, the amount of information input into the filter parameter calculation unit 11 can be reduced as compared with the case where parameters are acquired by the filter parameter calculation unit 11 based on pieces of information different from each other, and hence the control load of the filter parameter calculation unit 11 (CPU 2) can be reduced.

Second Embodiment

The structure of a controller 200 for an AC electric motor 1 according to a second embodiment is now described with reference to FIGS. 1 and 4. In the controller 200 according to this second embodiment, parameters are acquired by filter parameter calculation units 21 based on estimated values different from each other in removals of a plurality of frequency components, respectively, unlike the first embodiment in which the parameters are acquired by the filter parameter calculation unit 11 based on the common estimated value ωr3 in the removals of the plurality of frequency components. The same structures as those of the first embodiment are denoted by the same reference numerals, to omit the description.

(Structure of Controller for AC Electric Motor)

As shown in FIG. 1, the controller 200 for the AC electric motor 1 includes a CPU 22. The CPU 22 functions as a frequency component removal unit 20 and the filter parameter calculation units 21. In the CPU 22, the functions of the frequency component removal unit 20 and the filter parameter calculation units 21 can be achieved by software such as programs. The frequency component removal unit 20 and the CPU 22 are examples of a "frequency component remover" and a "control unit" in the claims, respectively. The filter parameter calculation units 21 are examples of a "parameter calculator" in the claims.

Figure 4:
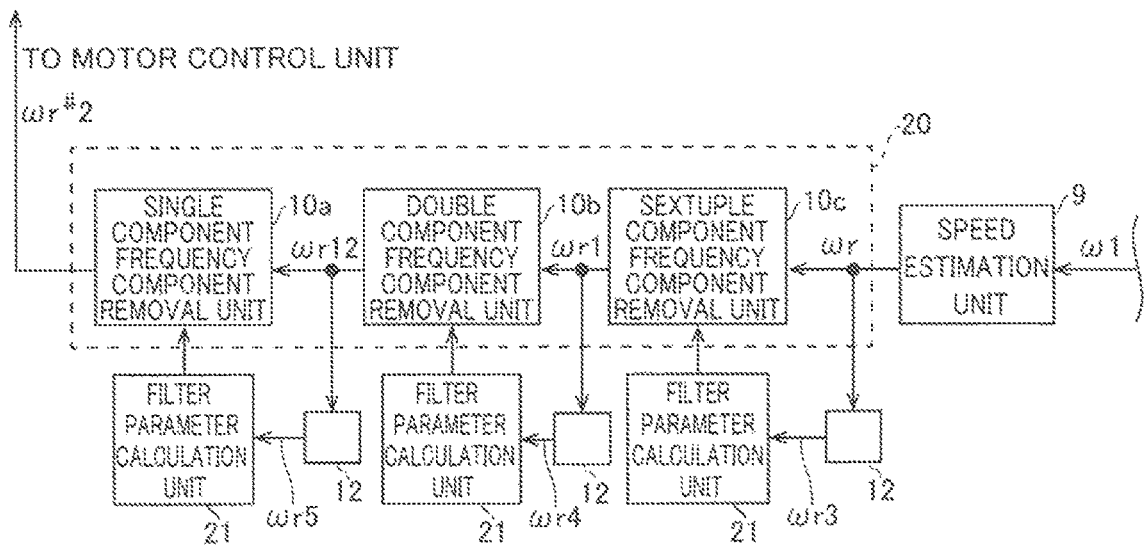
FIG. 4 is a diagram for illustrating the frequency component remover of the controller for the AC electric motor according to the second embodiment.

According to the second embodiment, as shown in FIG. 4, the frequency component removal unit 20 (CPU 22) (sextuple component frequency component removal unit 10c) removes a sextuple frequency component by feedforward control, using a parameter acquired by one filter parameter calculation unit 21 (CPU 22) based on an estimated value ωr3 based on an estimated value ωr as an input value. Then, the frequency component removal unit 20 (double component frequency component removal unit 10b) removes a double frequency component by feedforward control, using a parameter acquired by another filter parameter calculation unit 21 based on an estimated value ωr4 based on the estimated value ωr from which the sextuple frequency component has been removed as an input value. The estimated value ωr4 is a value acquired by one frequency limiting unit 12 (CPU 22) based on an estimated value ωr1. In this case, the sextuple frequency component and the double frequency component are examples of a "first frequency component" and a "second frequency component" in the claims, respectively. The estimated value ωr3 and the estimated value ωr4 are examples of "first information" and "second information" in the claims, respectively. The estimated value ωr4 is an example of "information" in the claims.

The frequency component removal unit 20 (single component frequency component removal unit 10a) removes a single frequency component by feedforward control, using a parameter acquired by the other filter parameter calculation unit 21 based on an estimated value ωr5 based on the estimated value ωr (i.e. an estimated value ωr12) from which the double frequency component has been removed as an input value. The estimated value ωr5 is a value acquired by another frequency limiting unit 12 based on the estimated value ωr12. The single frequency component is an example of a "second frequency component" in the claims. The estimated value ωr5 is an example of "information" or "second information" in the claims.

Then, a motor control unit 5 (CPU 22) performs PI control based on an estimated value ωr#2 from which the frequency component has been removed by the single component frequency component removal unit 10a.

The remaining structures of the second embodiment are similar to those of the first embodiment.

(Effects of Second Embodiment)

According to the second embodiment, the following effects can be obtained.

According to the second embodiment, as described above, the frequency component removal unit 20 (CPU 22) (sextuple component frequency component removal unit 10c) removes the sextuple frequency component by feedforward control, using the parameter acquired by one filter parameter calculation unit 21 (CPU 22) based on the estimated value ωr3 based on the estimated value ωr as the input value. Furthermore, the frequency component removal unit 20 (double component frequency component removal unit 10b) removes the double frequency component by feedforward control, using the parameter acquired by another filter parameter calculation unit 21 based on the estimated value ωr4 based on the estimated value ωr1 as the input value. Furthermore, the frequency component removal unit 20 (single component frequency component removal unit 10a) removes the single frequency component by feedforward control, using the parameter acquired by the other filter parameter calculation unit 21 based on the estimated value ωr5 based on the estimated value ωr12 as the input value.

Thus, the parameter is acquired by the filter parameter calculation unit 21 based on the estimated value ωr4 based on the estimated value ωr (i.e. the estimated value ωr1) from which the sextuple frequency component has been removed such that the parameter used to remove the double frequency component can be acquired in a state where the sextuple frequency component due to an estimation error has been removed, and hence a parameter more appropriate to remove the double frequency component can be acquired by the filter parameter calculation unit 21. Similarly, the parameter is acquired by the filter parameter calculation unit 21 based on the estimated value ωr5 based on the estimated value ωr (i.e. the estimated value ωr12) from which the double frequency component has been removed such that a parameter more appropriate to remove the single frequency component can be acquired by the filter parameter calculation unit 21.

The remaining effects of the second embodiment are similar to those of the first embodiment.

Third Embodiment

The structure of a controller 300 for an AC electric motor 1 according to a third embodiment is now described with reference to FIGS. 1 and 5. In the controller 300 according to the third embodiment, the order of frequency components to be removed is different from that according to the second embodiment. The same structures as those of the second embodiment are denoted by the same reference numerals, to omit the description.

(Structure of Controller for AC Electric Motor)

As shown in FIG. 1, the controller 300 for the AC electric motor 1 includes a CPU 32. The CPU 32 functions as a frequency component removal unit 30 and filter parameter calculation units 31. In the CPU 32, the functions of the frequency component removal unit 30 and the filter parameter calculation units 31 can be achieved by software such as programs. The frequency component removal unit 30 and the CPU 32 are examples of a "frequency component remover" and a "control unit" in the claims, respectively. The filter parameter calculation units 31 are examples of a "parameter calculator" in the claims.

According to the third embodiment, the frequency component removal unit 30 (CPU 32) removes a plurality of frequency components in order from a frequency of a larger ripple generated in an estimated value ωr when removing the plurality of frequency components different from each other. The magnitude of the ripple generated in the estimated value ωr according to each frequency is measured in a test at the time of manufacture of the controller 300. In this case, it is assumed that the measurement result that the magnitude of the ripple is large in the order of a single frequency, a sextuple frequency, and a double frequency is obtained.

Figure 5:
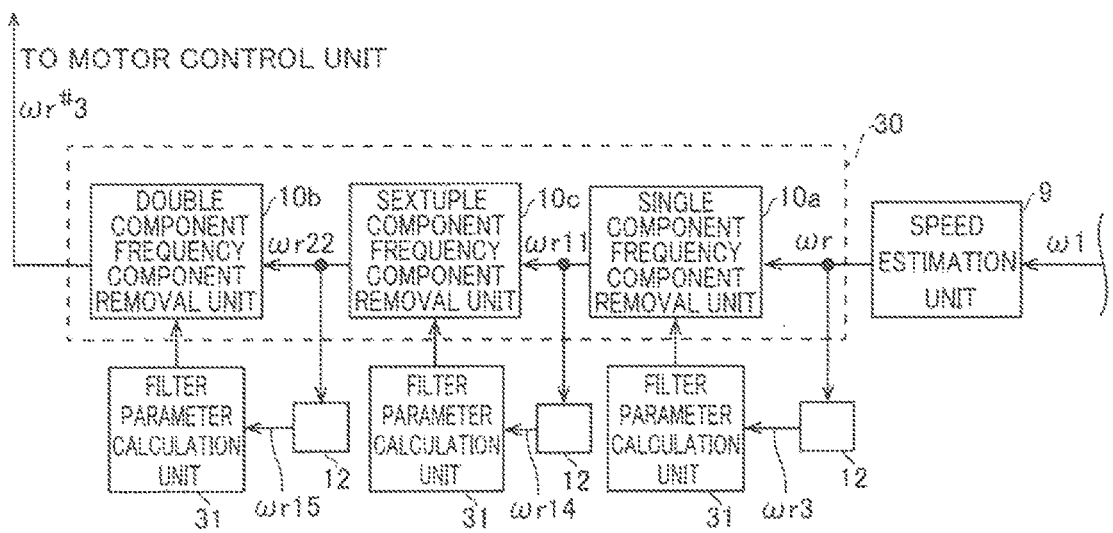
FIG. 5 is a diagram for illustrating the frequency component remover of the controller for the AC electric motor according to the third embodiment.

In this case, as shown in FIG. 5, first, a single component frequency component removal unit 10a removes a frequency component from the estimated value ωr acquired by a speed estimation unit 9 (CPU 32). Next, a sextuple component frequency component removal unit 10c removes a frequency component from an estimated value ωr11 from which the frequency component has been removed by the single component frequency component removal unit 10a. Finally, a doubled component frequency component removal unit 10b removes a frequency component from an estimated value ωr22 from which the frequency component has been removed by the sextuple component frequency component removal unit 10c. That is, the frequency component removal unit 30 removes the frequency components, using parameters acquired by the filter parameter calculation units 31 (CPU 32) in the order of a single component parameter, a sextuple component parameter, and a double component parameter. Then, a motor control unit 5 (CPU 32) performs PI control based on an estimated value ωr#3 from which the frequency component has been removed by the double component frequency component removal unit 10b.

Specifically, the frequency component removal unit 30 (single component frequency component removal unit 10a) removes a single frequency component by feedforward control, using the parameter acquired by one filter parameter calculation unit 31 based on an estimated value ωr3 based on the estimated value ωr as an input value. Then, the frequency component removal unit 30 (sextuple component frequency component removal unit 10c) removes a sextuple frequency component by feedforward control, using the parameter acquired by another filter parameter calculation unit 31 based on an estimated value ωr14 based on the estimated value ωr (i.e. the estimated value ωr11) from which the single frequency component has been removed as an input value. Note that the estimated value ωr14 is a value acquired by one frequency limiting unit 12 based on the estimated value ωr11. In this case, the single frequency component and the sextuple frequency component are examples of a "first frequency component" and a "second frequency component" in the claims, respectively. The estimated value ωr14 is an example of "information" or "second information" in the claims.

The frequency component removal unit 30 (double component frequency component removal unit 10b) removes a double frequency component by feedforward control, using the parameter acquired by the other filter parameter calculation unit 31 based on an estimated value ωr15 based on the estimated value ωr (i.e. the estimated value ωr22) from which the sextuple frequency component has been removed as an input value. The estimated value ωr15 is a value acquired by another frequency limiting unit 12 based on the estimated value ωr22. The double frequency component is an example of a "second frequency component" in the claims. The estimated value ωr15 is an example of "information" or "second information" in the claims.

The remaining structures of the third embodiment are similar to those of the second embodiment.

Effects of Third Embodiment

According to the third embodiment, the following effects can be obtained.

According to the third embodiment, as described above, the frequency component removal unit 30 (CPU 32) removes the plurality of frequency components in order from the frequency of the larger ripple generated in the estimated value ωr when removing the plurality of frequency components different from each other. Thus, a removal of the frequency component at least in a subsequent stage of removals of the plurality of frequency components can be performed in a state where the influence of a ripple (pulsating component) due to an estimation error is relatively significantly reduced or prevented. Consequently, the estimation error of the rotational speed of the AC electric motor 1 can be effectively reduced as compared with the case where a plurality of frequency components is removed in a state where relatively large ripples remain.

The remaining effects of the third embodiment are similar to those of the second embodiment.

Modified Examples

The embodiments disclosed this time must be considered as illustrative in all points and not restrictive. The range of the present invention is shown not by the above description of the embodiments but by the scope of claims for patent, and all modifications (modified examples) within the meaning and range equivalent to the scope of claims for patent are further included.

Figure 6:
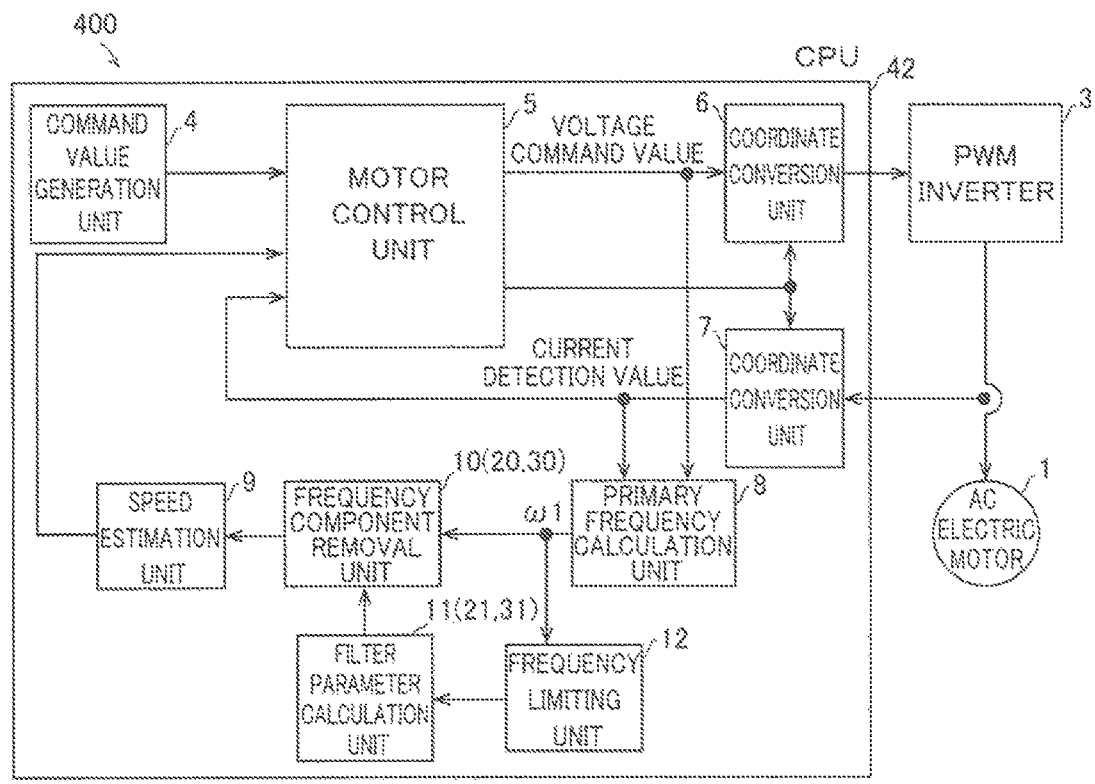
FIG. 6 is a diagram showing the overall structure of a controller for an AC electric motor according to a modified example of the first to third embodiments.

For example, while the frequency components are removed by feedforward control, using the estimated value of the rotational speed of the AC electric motor as the input value in each of the aforementioned first to third embodiments, the present invention is not restricted to this. For example, the frequency components may alternatively be removed by feedforward control, using the frequency of the output voltage of the power converter (PWM inverter 3) as the input value. Specifically, as shown in FIG. 6, a controller 400 according to a modified example of the first to third embodiments includes a CPU 42. A frequency component removal unit 10 (20, 30) (CPU 42) removes predetermined frequency components from a primary frequency command value ω1 by feedforward control, using the primary frequency command value ω1 acquired by a primary frequency calculation unit 8 (CPU 42) as an input value. In this case, the primary frequency calculation unit 8 and the primary frequency command value ω1 are examples of an "acquirer" and an "acquired value" in the claims, respectively. The CPU 42 is an example of a "control unit" in the claims.

While the parameters are acquired by the parameter calculators (filter parameter calculation units 21 or 31) based on pieces of information different from each other in the removals of the plurality of frequency components, respectively, in each of the aforementioned second and third embodiments, the present invention is not restricted to this. For example, similarly to the first embodiment, the parameters may alternatively be acquired by the parameter calculators (filter parameter calculation units 21 or 31) based on common information (estimated value ωr3) in the removals of the frequency components.

While the functions of the command value generation unit 4, the motor control unit 5, the coordinate conversion unit 6, the coordinate conversion unit 7, the primary frequency calculation unit 8, the speed estimation unit 9, the frequency component removal unit 10 (20, 30), the filter parameter calculation unit(s) 11 (21, 31), and the frequency limiting unit(s) 12 are achieved by software such as programs in each of the aforementioned first to third embodiments, the present invention is not restricted to this. For example, all or some of the functions described above may alternatively be achieved by hardware.

While the control unit (motor control unit 5) sets the voltage command value by performing PI control based on the speed command value in each of the aforementioned first to third embodiments, the present invention is not restricted to this. For example, the control unit (motor control unit 5) may alternatively set the voltage command value by performing PI control based on a torque command value.

While the frequency component remover (frequency component removal unit 10 (20, 30)) removes the single frequency component, the double frequency component, and the sextuple frequency component in each of the aforementioned first to third embodiments, the present invention is not restricted to this. For example, the frequency component remover (frequency component removal unit 10 (20, 30)) may alternatively remove an n-fold (n=4, for example) frequency component other than the above.

While the frequency component remover (frequency component removal unit 10 (20, 30)) removes the three different frequency components in each of the aforementioned first to third embodiments, the present invention is not restricted to this. For example, the frequency component remover (frequency component removal unit 10 (20, 30)) may alternatively remove one, two, or four or more different frequency components.

While the AC electric motor is an induction motor in each of the aforementioned first to third embodiments, the present invention is not restricted to this. For example, the AC electric motor may alternatively be a permanent magnet type synchronous motor.

While the frequency component remover (frequency component removal unit 10 (20, 30)) includes a notch filter in each of the aforementioned first to third embodiments, the present invention is not restricted to this. For example, the frequency component remover may alternatively include software or a circuit other than the notch filter.

What is claimed is:

1. A controller for an AC electric motor that controls driving of the AC electric motor based on a voltage command value set based on one of a torque command value and a speed command value for driving the AC electric motor and a current detection value at which a current that flows to the AC electric motor during the driving of the AC electric motor is detected, comprising:
a power converter that drives the AC electric motor;
an acquirer that acquires at least one of a frequency of an output voltage of the power converter and an estimated value of a rotational speed of the AC electric motor based on the voltage command value and the current detection value; and
a frequency component remover for performing feedforward control so that a predetermined frequency component is removed from an acquired value acquired by the acquirer as an input value.

2. The controller for the AC electric motor according to claim 1, further comprising a parameter calculator into which information based on the acquired value is input and that acquires, based on the input information, a parameter for the frequency component remover to remove the predetermined frequency component,
wherein the frequency component remover performs the feedforward control to remove the predetermined frequency component from the acquired value, based on the acquired value and the parameter acquired by the parameter calculator as input values.

3. The controller for the AC electric motor according to claim 2, further comprising a limiter that limits a range of the acquired value acquired by the acquirer where the parameter calculator acquires the parameter.

4. The controller for the AC electric motor according to claim 1, wherein the frequency component remover removes a plurality of frequency components in descending order of frequencies to be removed when removing the plurality of frequency components different from each other.

5. The controller for the AC electric motor according to claim 4, further comprising a parameter calculator into which information based on the acquired value is input and that acquires, based on the input information, a parameter for the frequency component remover to remove the predetermined frequency component, wherein
the frequency component remover removes each of the plurality of frequency components by the feedforward control, based on the parameter acquired by the parameter calculator with the information for a first frequency component removal in removals of the plurality of frequency components, as the input value.

6. The controller for the AC electric motor according to claim 4, further comprising a parameter calculator into which information based on the acquired value is input and that acquires, based on the input information, a parameter for the frequency component remover to remove the predetermined frequency component,
wherein the frequency component remover removes a first frequency component by the feedforward control, based on the parameter acquired by the parameter calculator based on first information based on the acquired value as the input value, and removes a second frequency component different from the first frequency component by the feedforward control, based on the parameter acquired by the parameter calculator based on second information based on the acquired value from which the first frequency component has been removed as the input value.

7. The controller for the AC electric motor according to claim 1, wherein the frequency component remover removes a plurality of frequency components in order from a frequency of a larger ripple generated in the acquired value when removing the plurality of frequency components different from each other.

8. A controller for an AC electric motor that controls driving of the AC electric motor based on a voltage command value set based on one of a torque command value and a speed command value for driving the AC electric motor and a current detection value at which a current that flows to the AC electric motor during the driving of the AC electric motor is detected, comprising:
a control unit; and
a power converter that drives the AC electric motor,
wherein the control unit acquires at least one of a frequency of an output voltage of the power converter and an estimated value of a rotational speed of the AC electric motor based on the voltage command value and the current detection value, and removes a predetermined frequency component from an acquired value by feedforward control based on the acquired value.

9. The controller for the AC electric motor according to claim 8, wherein the control unit acquires a parameter for removal of the predetermined frequency component based on information based on the acquired value, and removes the predetermined frequency component from the acquired value by the feedforward control based on the acquired value and the acquired parameter.

10. The controller for the AC electric motor according to claim 9, wherein the control unit limits a range of the acquired value for acquiring the parameter.

* * * * *